United States Patent [19]

Wright

[11] Patent Number: 5,114,510
[45] Date of Patent: May 19, 1992

[54] METHOD OF FORMING A LIGHTWEIGHT STRUCTURAL PANEL

[76] Inventor: John T. Wright, 19 Kratz Rd., Harleysville, Pa. 19438

[21] Appl. No.: 588,144

[22] Filed: Sep. 26, 1990

[51] Int. Cl.$^5$ ............................................. B32B 31/24
[52] U.S. Cl. .................... 156/82; 156/308.6; 156/309.9; 156/322; 156/324; 427/39; 427/223; 427/318; 427/327; 427/409; 427/444
[58] Field of Search ............ 156/82, 243, 244.11, 156/244.23, 322, 324, 497, 308.6; 427/39, 223, 318, 327, 409, 444

[56] References Cited

U.S. PATENT DOCUMENTS

| | | | |
|---|---|---|---|
| 2,545,370 | 3/1951 | Mittelmann | 156/322 |
| 3,075,868 | 1/1963 | Long | 156/82 |
| 3,451,871 | 6/1969 | Bauer et al. | 156/244.23 |
| 3,773,600 | 11/1973 | Rudnev | 156/324 |
| 3,924,035 | 12/1975 | Miller | 427/327 |
| 4,396,450 | 8/1983 | Blenner et al. | 427/327 |
| 4,524,089 | 6/1985 | Hague et al. | 427/327 |
| 4,622,237 | 11/1986 | Lori | 427/327 |

FOREIGN PATENT DOCUMENTS 1053173 12/1966 United Kingdom ........... 156/244.23

*Primary Examiner*—Caleb Weston
*Attorney, Agent, or Firm*—Evelyn M. Sommer

[57] ABSTRACT

A lightweight structural panel is formed by subjecting a surface of a metal cover sheet to an oxidizing treatment to remove any foreign substances thereon, applying an adhesive layer to a core member, and bonding the treated surface of the metal cover sheet to the adhesive layer on the core member. Preferably, the oxidizing treatment is by electron plasma surface treatment for a period of time sufficient to oxidize any oil, chemical film, or rust on the surface of the metal sheet. The core member is made of a plastic material which may also be subjected to electron plasma surface treatment. The metal cover sheet may instead be flame-treated, or treated with oxidizing chemicals such as hydrazine. Metal cover sheets may be bonded on both sides of the plastic core.

9 Claims, 1 Drawing Sheet

METHOD OF FORMING A LIGHTWEIGHT STRUCTURAL PANEL

FIELD OF INVENTION

The invention relates to a method of forming a lightweight structural panel, particularly one which is a laminate of a metal cover sheet and a lightweight core.

BACKGROUND ART

Lightweight structural panels are used in the construction industry, and are particularly desired for outdoor use. The ideal panel is lightweight and relatively inexpensive to manufacture, has high insulation qualities, and is weather resistant. An example of a structural panel for housing use, having plastic cover sheets and a foam core, is disclosed in U.S. Pat. No. 4,133,930 to J. Wright (same inventor) and K. Wolfe, issued Jan. 9, 1979.

For heavier commercial and industrial applications, such as forming truck and freight car bodies, automotive panels, and architectural panels, it is desireable to have a structural panel that has sheet metal or metallized cover sheets bonded with adhesive layers to a core of foam or plastic material. It is important that the a good bond is formed between the metal, adhesive, and foam layers of the laminate structure. However, the metal cover sheets of the laminate often have oil spots or chemical films picked up in handling or rust spots which weaken the bond with the adhesive layer, and results in a risk of delamination of the layers. Solvents are typically used to clean the metal surfaces prior to bonding. However, such solvents often contain highly toxic materials and their use results in the production of hazardous wastes.

Accordingly, it is a principal object of the invention to provide a method of forming a good bond between the metal cover sheets, adhesive layers, and foam core of a laminate panel. It is a specific object to remove any oil spots or other chemical films which may appear on the metal sheets, prior to bonding, them with the adhesive layers to the foam core, without the use of toxic solvents. It is also desired to produce a superior structural panel as a result of good bonding techniques.

SUMMARY OF INVENTION

In accordance with the invention, a method of forming a lightweight structural panel having a metal cover sheet and a lightweight core member comprises the steps of subjecting a surface of the metal cover sheet to an oxidizing treatment to remove any foreign substance thereon, applying an adhesive layer to the core member, and bonding the treated surface of the metal cover sheet to the adhesive layer.

In a preferred method, the metal cover sheet is treated with an electron plasma surface treatment for a period of time sufficient to oxidize any oil or chemical films or any organic or inorganic films (e.g., $PO_4$, $AlO$) on its surface, and the metal sheet is bonded to the plastic core using a reactive adhesive. The surface of the metal sheet is changed to free radical condition which more readily accepts the adhesive, particularly, a reactive adhesive. The core member is made of a plastic material which may also be subjected to a plasma surface treatment. The metal cover sheet may instead be flametreated, or treated with oxidizing chemicals such as hydrazine. Metal cover sheets may be bonded on both sides of the plastic core.

The features and advantages of the invention are described in detail below in conjunction with the drawings, in which:

DETAILED DESCRIPTION OF INVENTION

Figure 1:
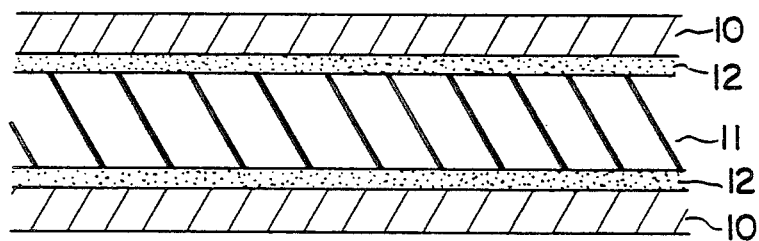
FIG. 1 is a cross-sectional view of a structural panel in accordance with the present invention.

Referring to FIG. 1, a lightweight structural panel has a metal cover sheet 10 is bonded on one or both sides of a core member 11 of plastic or foam material through an adhesive layer 12. The cover sheet 10 may be sheet metal, such as aluminum, or a metallized sheet, such as a metallized layer on a suitable substrate.

Figure 2:
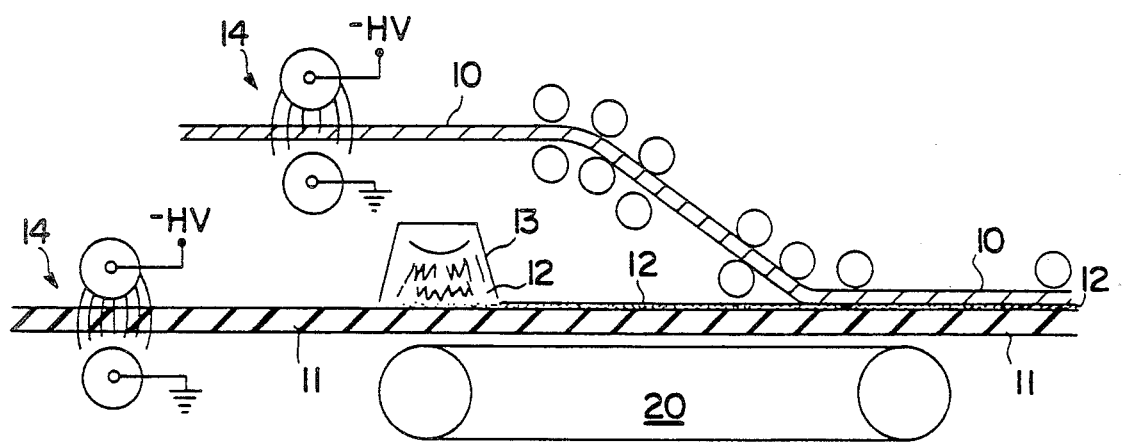
FIG. 2 is a schematic diagram of the treatment method of the present invention.

The metal cover sheet is bonded to the core member by the process illustrated schematically in FIG. 2. In a preferred method, the core member 11 is transported in the machine direction, indicated by the arrow, on a conveyor 20 or other suitable driven line. Adhesive material is misted or sprayed on the upper surface of the core member 11 at an applicator station 13 to form the adhesive layer 12 on the core member 11. At the same time, the metal sheet 10 has its lower surface exposed to a surface treatment station 14 across the entire width of the sheet, then the treated surface of the sheet is mated with the adhesive layer 12 to form the resulting laminate.

Instead of a continuous line, a batch treatment method may be used to treat the surface of separate sheet units of standard size, which are then bonded to core units of like standard size. This batch treatment method allows the laminate to be formed in a fast, commercially acceptable time. For example, speeds of 25-100 ft/min. may be used. The treatment in accordance with the invention, as explained hereinbelow, results in good adhesion of the metal sheet to the core member across the entire width of the laminate. In contrast, the metal sheet bonding in some conventional continuous laminate forming methods is good only to within about 2 inches of the edges of the web, thereby requiring the edges to be cut off and recycled.

The preferred surface treatment of the metal sheet is by electron plasma surface treatment as indicated in FIG. 2. The treatment takes place in an atmosphere of ordinary air, $NO_2$, xenon, neon, or argon gas. The plasma is generated even in an inert gas atmosphere. No vacuum is required for the surface treatment. The electron plasma can be generated by conventional electrical generators operated at radio frequencies, which are used in the industry as corona discharge devices. The electron plasma creates a chemically active (ozonation) zone around the metal layer which involves formation of ozone. The treatment area can be controlled by controlling the spacing of the electron discharge elements an design of appropriate insulators. For example, a spacing of 1.5 inches for the electron discharge elements may be used for process speeds of 5 ft/min.

Oil, rust spots, or films on the surface of the metal sheet are oxidized by the ozone atmosphere created by the electron plasma in the treatment zone, so that the metal surface is changed to free radical condition to accept the adhesive better than plain metal alone in a normal oxygen atmosphere would. Such treatment of the metal surface also renders the metal sheet more malleable, i.e. bendable or ductile, so that it does not crack when worked or shaped into laminate forms. The metal sheet may be aluminum, copper, lead, steel, galvanized steel, or metal with a painted surface. As an alternative to electron plasma surface treatment, the metal surface may be flame treated or wiped with oxidizing chemicals, such as hydrazine, but a less complete effect is obtained as compared to the electron plasma surface treatment.

The core member 11 may be any form of lightweight layer made of polyester, polypropylene, polyvinyl chloride, nylon, epoxy, polyurethane, acrylic, foam, etc. As a further step, the surface of the core member may also be electron-plasma treated to remove foreign. substances therefrom and to form free radicals on the surface. The adhesive material is preferably a reactive polyester, epoxy or polyurethane (any of a number of types of latexes) for greater adhesion to the free radical elements of the treated metal surface. Heat and/or pressure may be applied to the adhesive for spraying or misting. Since epoxy tends to be brittle, a polyurethane adhesive or a modified epoxy (TS) with greater elasticity can be used if the laminate is to be bent or worked.

The structural panel prepared in accordance with the invention has a better bonding characteristic which reduces the risk of delamination. In accelerated testing, laminate panels formed according to the invention showed no delamination after the equivalent of 10 years of wear. The laminated panels can be used as structural panels for forming truck or freight-car bodies, automotive panels, architectural panels, equipment housings and machinery components. The plastic core provides sound deadening or vibration damping, and the metal layer can provide grounding protection.

Numerous modifications and variations may be made in light of the principles of the invention disclosed above. All such modifications and variations are intended to be included within the spirit and scope of the invention, as defined in the following claims.

What is claimed is:

1. A method of forming a lightweight structural panel comprising the steps of:
   treating a first surface of a metal cover sheet to an oxidizing treatment to remove foreign substances therefrom;
   treating a first surface of a lightweight core member to an electron, plasma treatment to remove foreign substances therefrom, said lightweight core member being made of a plastic sound-deadening material;
   applying an adhesive layer to the treated first surface of said core member, said adhesive being a reactive adhesive material;
   bonding the treated first surface of said metal cover sheet to treated first surface of said lightweight core member through said reactive adhesive layer.

2. The method according to claim 1, wherein the surface of the metal cover sheet is treated with an electron plasma surface treatment for a period of time sufficient to oxidize any oil, chemical film, or rust on its surface.

3. The method according to claim 1 wherein the adhesive is applied by misting or spraying on the core member before the heated metal sheet is placed thereon.

4. The method according to claim 1, wherein the reactive adhesive is a reactive epoxy or polyurethane.

5. The method according to claim 1, wherein the metal cover sheet is treated by flame-treatment.

6. The method according to claim 1, wherein the metal cover sheet is treated with an oxidizing chemical.

7. The method according to claim 6, wherein the oxidizing chemical is hydrazine.

8. The method according to claim 1, wherein metal cover sheets are bonded on both sides of the core member.

9. The method according to claim 1, wherein the oxidizing treatment consists of activating the surface of the metal sheet in an oxidizing surrounding atmosphere.

* * * * *